Figures 1, 2:
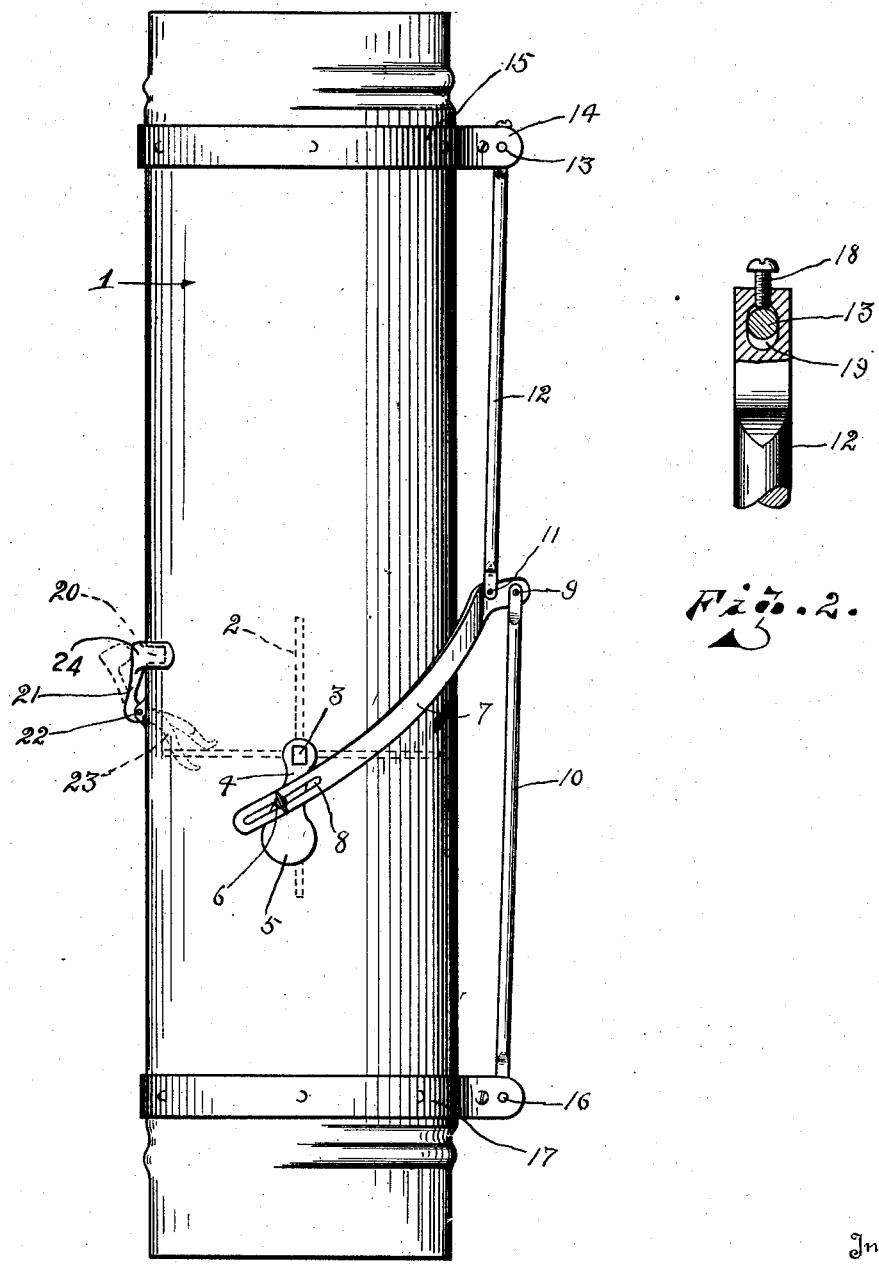

Oct. 7, 1930. F. E. MAKI 1,777,854
DAMPER CONTROL
Filed Feb. 18, 1929

Inventor
Frank E. Maki
By Geo Stevens.
Attorney

Patented Oct. 7, 1930

1,777,854

UNITED STATES PATENT OFFICE

FRANK E. MAKI, OF DULUTH, MINNESOTA, ASSIGNOR OF ONE-HALF TO MAURITS NIEMINEN, OF DULUTH, MINNESOTA

DAMPER CONTROL

Application filed February 18, 1929. Serial No. 340,715.

This invention relates to damper controls and has special reference to automatic means for controlling the ordinary damper in a stovepipe.

The principal object of the invention is to produce a simple and more efficient device of this character than heretofore known.

Another object is to provide such a device having in combination therewith means for operating a check damper simultaneously therewith.

A further object is to provide simple means whereby the control device may be adjusted to suit circumstances.

Other objects and advantages of the invention will appear in the following description thereof.

Referring now to the accompanying drawing, forming part of this application, and wherein like reference characters indicate like parts:

Figure 1 is a side elevation of a length of stovepipe equipped with one embodiment of the improved mechanism; and Figure 2 is an enlarged side elevation of the upper end of one of the control rods showing the pivotal connection thereof in section and the adjusting mechanism.

1 represents an ordinary length of stovepipe having installed therein the usual damper indicated at 2, the operating rod of which is illustrated at 3, it extending outwardly from the pipe and to which is attached the depending crank arm 4 which I prefer to enlarge somewhat at its free end as at 5 to act as a counterweight whereby the damper is normally held in open position. Intermediate of the ends of the crank arm 4 is a loose pivotal connection 6 to the lever 7 which is provided with an elongated slot 8 for such pivotal connection.

The lever 7 is of considerable length and extends partially around the pipe 1 so as to give it sufficient length for proper operation of the crank arm 4 during the movement thereof. The opposite end of the lever is pivoted as at 9 to the depending operating rod 10, and as at 11 to the upwardly extending operating rod 12. The upper end of this latter rod is pivotally mounted upon the rivet or bolt 13 which extends through the spaced termini 14 of the band 15 which encircles the stovepipe 1 adjacent the upper end thereof.

The lower end of the operating rod 10 is pivoted as at 16 in a like manner to the band 17, but the connection of the rod 12 differs from that of the rod 10 in that directly above the pivotal connection 13 the end of the rod is provided with an adjusting screw 18, and the hole 19 in the rod which surrounds the pivot 13 being elongated permits of the length of the rod in respect to the pivotal connection being changed by adjustment of the screw, as is obvious, so that by this means the throw of the lever 7 may be controlled, and nicety of adjustment of the device readily accomplished.

Just above the damper 2 and through one side of the stovepipe is formed a check damper vent or vents 20 for the admission of cold air into the pipe above the damper. This opening is controlled by the L-shaped lever-like member 21, pivoted as at 22 in spaced out turned portions of the pipe wall accomplished by forcing a hole therethrough for the insertion of the operating end 23 of the lever 21 which extends into the interior of the pipe for engagement by the damper 2 when the latter is rotated to horizontal position or thereabouts. The upper end of the lever 21 is provided with an arcuately shaped closure member 24 which is designed to fit the outside wall of the pipe when in closed position, and effectually close the cold air opening 20. The weight of the operating end 23 of the lever is sufficient to normally keep this damper closed, and by which arrangement it is obvious that the check damper is automatically opened when the larger damper is closed, thereby augmenting the efficiency of the device in the control of draft through the pipe.

From the foregoing it is evident that when expansion of the pipe section 1 takes place through heating of the device, the damper will be automatically controlled, and if overheating occurs so that the main damper is wholly closed the auxiliary damper will be opened so as to further check the draft through the pipe, and when sufficiently cooled and the elements consequently contract the reverse action of the dampers takes place.

Having thus described my invention, what I claim and desire to secure by Letters Patent, is:

Damper control means for a stovepipe comprising in combination two opposed operating rods disposed longitudinally of the pipe, means for rigidly fixing the extreme opposite ends of the rods to the stovepipe, a lever having one end pivotally attached at horizontally spaced points to the adjacent ends of the rods, a rotative damper within the pipe, and a crank arm pivotally uniting the free end of the lever with the shaft of the damper whereby longitudinal expansion or contraction of said stove pipe will operate the damper.

In testimony whereof I affix my signature.

FRANK E. MAKI.